United States Patent [19]
Bradley et al.

[11] 3,877,957
[45] Apr. 15, 1975

[54] PIGMENT COMPOSITION
[75] Inventors: Gordon Frank Bradley, Paisley; David Price, Beith, both of England
[73] Assignee: Ciba-Geigy Corporation, Ardsley, N.Y.
[22] Filed: Aug. 6, 1973
[21] Appl. No.: 385,802

Related U.S. Application Data
[63] Continuation-in-part of Ser. No. 156,466, June 24, 1971, abandoned.

[30] Foreign Application Priority Data
June 26, 1970 United Kingdom............... 31054/70

[52] U.S. Cl................................. 106/288 Q; 106/20
[51] Int. Cl............................................ C08h 17/14
[58] Field of Search............ 106/288 Q, 289, 308 Q, 106/309

[56] References Cited
UNITED STATES PATENTS

| | | |
|---|---|---|
| 3,446,641 | 5/1969 | Mitchell et al.................. 106/288 Q |
| 3,522,520 | 10/1970 | Dawson et al......................... 106/23 |
| 3,661,611 | 5/1972 | Dawson et al.................. 106/308 Q |
| 3,725,101 | 4/1973 | Kuhne et al. .................. 106/288 Q |
| 3,759,733 | 9/1973 | Bradley et al...................... 106/309 |
| 3,776,749 | 12/1973 | Bradley et al.................. 106/288 Q |

Primary Examiner—Winston A. Douglas
Assistant Examiner—J. V. Howard
Attorney, Agent, or Firm—Wenderoth, Lind & Ponack

[57] ABSTRACT
Pigment compositions consisting of a first pigment and a second pigment, both being preferably azo pigments, are useful for the manufacture of paints and printing inks of enhanced properties.

7 Claims, No Drawings

PIGMENT COMPOSITION

This is a continuation-in-part of Ser. No. 156,466 filed June 24, 1971, now abandoned.

The suitability of a pigment for dispersion in any given medium for any particular use may be assessed in terms of the rheological properties, tinctorial strength, gloss, transparency, hue and wettability/dispersibility characteristis exhibited by the pigment in the medium. In general terms, all these can be related to the crystallographic properties of the pigment and to the surface properties of the pigment particles, which are to a considerable extent interdependent.

It is known that the surface of organic pigment particles can be modified by adsorbing onto the particles a wide variety of surface active agents or solvents, or by having such materials present during the formation of the pigment. By changing the surface of the particles in this manner, it has been found possible to change the degree of dispersion in printing ink and paint media and hence change the rheological properties of the system with corresponding changes in the transparency and gloss of the pigment.

We have now discovered a further method by means of which organic pigments with improved properties can be obtained; according to this invention, a pigment composition comprises particles of a first organic pigment wholly or at least partially coated with a second organic pigment.

The invention is primarily applicable to arylamide and diarylide pigments; the former group is formed, for example, by coupling a diazotized nitroaniline with an acetoacetarylamide, whereas the latter is prepared, for example, by coupling tetrazotized 3:3'-dichlorobenzidine itself or a tetrazotized 3:3'-dichlorobenzidine bearing further substituents in the aromatic nuclei with an acetoacetarylamide. Normally 3:3'-dichlorobenzidine itself is used, but substituted 3:3'-dichlorobenzidines can be used; for example, pigments have been prepared from tetrachlorobenzidines. Examples of coupling agents which have been used are acetoacetanilide, acetoacet-o-toluidide, acetoacet-p-toluidide, acetoacet-o-anisidide and acetoacet-2,4-xylidide.

Suitable arylamide pigments include pigments having the formula:

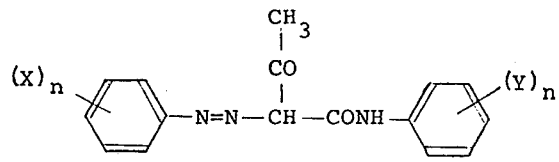

wherein X is hydrogen, methyl, methoxy, halogen or nitro or combinations of these groups when $n>1$, and Y is hydrogen, methyl, methoxy or halogen or combinations of these groups when $n>1$
or

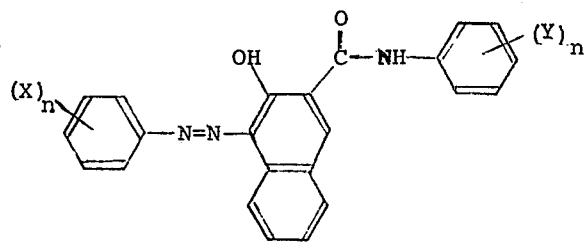

wherein X, Y and $n$ have the above significance.

Suitable diarylide pigments are disclosed in allowed U.S. application Ser. No. 141,004 of Robert McKay and Gordon Bradley filed May 6, 1971, U.S. Pat. No. 3,776,749. Such pigments are, for example, of the formula:

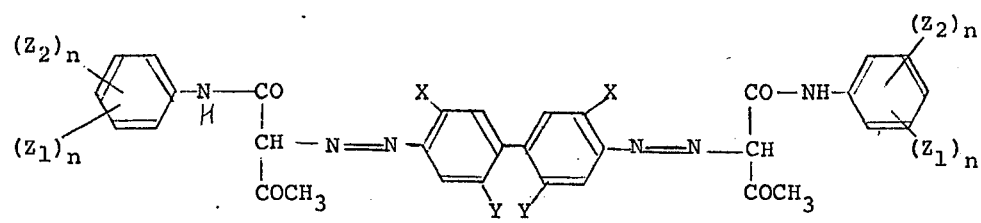

wherein X and Y are the same or different and each is H, $CH_3$, $OCH_3$ or Cl, and $Z_1$ and $Z_2$ are the same or different and each is H, $CH_3$, $OCH_3$ or Cl and $n$ is 1 or 2;

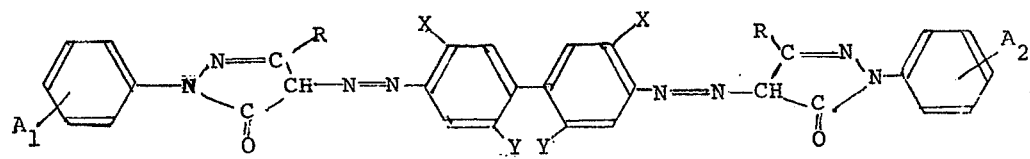

wherein X and Y are the same or different and each is H, $CH_3$, $OCH_3$ or Cl and $A_1$ and $A_2$ are the same or different and each is H, or alkyl, halogen and R is alkyl, carbalkoxy or carboxamide residues;
or

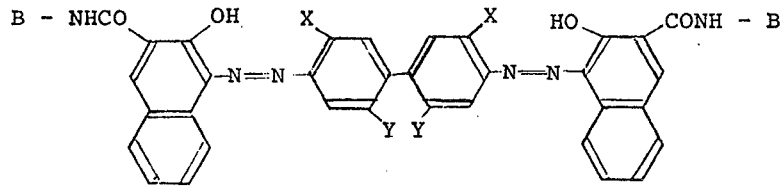

wherein X and Y are the same or different and each is H, CH$_3$, OCH$_3$ or Cl and B is the group

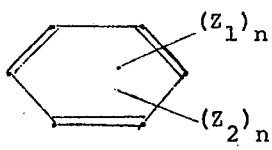

wherein $Z_1$ and $Z_2$ are the same or different and each is H, CH$_3$, OCH$_3$ and Cl, and $n$ is 1 or 2, or B is an α-naphthyl residue.

Azo pigments are normally produced by coupling the diazotized component with the coupling agent in aqueous medium. After the coupling, the reaction mixture is boiled, and the pigment worked up. Two parameters of the resulting pigment are of importance, the mean primary particle size and the mean crystallite size within each particle, and it is found that better rheological properties are obtained when the pigments are incorporated in printing ink media for any given mean primary particle size of the pigment if the mean crystallite size is large, and indeed approaches the mean primary particle size. In the present invention we take the basic core pigment and modify its surface with a complete or partial coating of another pigment of similar structure. Thus, for example, the pigment prepared by coupling acetoacet-o-anisidide with 3:3'-dichlorobenzidine is in the form of small crystallites (amorphous in X-ray powder photograph) and has poor flow properties in printing inks, whereas the pigment prepared by coupling acetoacet-m-xylidide with 3:3'-dichlorobenzidine is in the form of large crystallites and has good flow properties; a pigment composition of particles of acetoacet-o-anisidide coupled to 3:3'-dichlorobenzidine particles coated with acetoacet-m-xylidide coupled to 3:3'-dichlorobenzidine combines the desirable properties of each pigment.

The following Table illustrates suitable azo pigments:

1. Benzidine Yellows

| Name or Colour Index Number | Formed by coupling |
| --- | --- |
| Pigment Yellow 12 (Colour Index No. 21090) | 3:3'-dichlorobenzidine and acetoacetanilide |
| Pigment Yellow 13 (Colour Index No. 21100) | 3:3'-dichlorobenzidine and acetoacet-2,4-xylidide |
| Pigment Yellow 14 (Colour Index No. 21095) | 3:3'-dichlorobenzidine and acetoacet-o-toluidide |
| Pigment Yellow 17 (Colour Index No. 21105) | 3:3'-dichlorobenzidine and acetoacet-o-anisidide |
| Pigment Yellow 81 | 2:2':5:5'-tetrachlorobenzidine and acetoacet-2,4-xylidide |
| — | 3:3'-dichlorobenzidine and acetoacet-p-toluidide |
| — | 3:3'-dichlorobenzidine and acetoacet-o-chloranilidide |

2. Benzidine Oranges

| | |
| --- | --- |
| Pigment Orange 15 (Colour Index No. 21130) | 3:3'-dichlorobenzidine and 1-phenyl-3-methyl-5-pyrazolone |
| Pigment Orange 34 (Colour Index No. 21115) | 3:3'-dichlorobenzidine and 1-p-tolyl-3-methyl-5-pyrazolone |

3. Benzidine Reds

| | |
| --- | --- |
| Pigment Red 37 (Colour Index No. 21205) | 3:3'-dimethoxybenzidine and 1-p-tolyl-3-methyl-5-pyrazolone |
| Pigment Red 41 (Colour Index No. 21200) | 3:3'-dimethoxybenzidine and 1-phenyl-3-methyl-5-pyrazolone |

4. Benzidine Blues

| | |
| --- | --- |
| Pigment Blue 20 (Dianisidine Blue) | 2:3'-dimethoxy benzidine and anilide of 2-naphthol-3-carboxylic acid |

5. Tolidine Yellows

| | |
| --- | --- |
| Pigment Yellow (Colour Index No. 21135) | 3:3'-dimethylbenzidine and acetoacet-o-toluidide |

Pigment compositions according to the invention may be prepared in the following manner. A slurry of the first pigment is prepared, and then the second pigment is precipitated in the slurry, so that some of the second pigment species will preferentially precipitate onto the nuclei already present, that is the particles of the first pigment, and form a coating on them. It is believed that some of the second organic pigment on formation during a precipitation process grows onto existing crystallites of the first pigment at high energy active sites, such as dislocation sites. This coating action occurs even if the second pigment is only present in small proportions. This process is particularly successful in the case of azo pigments; the first pigment can be prepared in a coupling solution, and then the second pigment prepared in the same solution without the necessity for isolation of the first pigment. The same or a different coupling agent may be used for the two pigments.

Evidence that coating of the pigment core is achieved may be obtained as follows. If a pigment core of acetoacet-m-xylidide coupled to tetrazo 3:3'-dichlorobenzidine is treated in such a way that one might assume, according to our invention, that a pigment coating of acetoacet-o-anisidide coupled to tetrazo 3:3'-dichlorobenzidine would be formed on it, and if the system is boiled at the slurry stage, the crystallite growth of the core is inhibited by the pigment coating. This is shown by X-ray powder photography. On the other hand, if a physical mixture of slurries obtained by mixing freshly prepared acetoacet-m-xylidide coupled to tetrazo 3:3'-dichlorobenzidine and freshly prepared acetoacet-o-anisidide coupled to tetrazo 3:3'-dichlorobenzidine, that is not obtained by coprecipitation, is boiled, no inhibition of growth of the crystallite particles in the core can be observed.

The effect of the invention is to form a coating or partial coating of a second organic pigment onto a core of a first pigment. The optical properties of the pigment core are not dramatically altered, since the optical properties of the composition will be somewhere between the properties of each pigment. What is in effect achieved is a composition with the optical properties of a first pigment but the surface properties of a second pigment when the coating pigment is present in small quantities.

Suitable proportions of pigments range from 5 – 95 parts by weight of the coated pigment to 95–5 parts by weight of the coating pigment.

In the case of monoazo pigments such as the arylamide yellows, the core pigment can be represented a A—N=N—B where A is the diazo component and B is the coupling component. We can coat onto this either 1. a monoazo pigment represented as A—N=N—D where D is a coupling component different from that used in the core pigment, or 2. a monoazo pigment represented as C—N=N—B where C is a diazo component different from that used in the core pigment, or 3. a monoazo pigment represented as C—N=N—D where both diazo component and coupling component are different from those used in the core pigment.

In the case of disazo pigments such as the benzidine yellows, the core pigment can be represented as F — N = N — E — N = N — F where E is the tetrazo component and F is the coupling component. This can be coated with 1. H — N = N — E — N = N — H where H is a coupling component different from that used in the core pigment, or
2. F — N = N — G — N = N — F where G is a tetrazo component different from that used in the core pigment, or
3. H — N = N — G — N = N — H where both tetrazo and coupling component differ from those used in the core pigment.

It is also possible to have a monoazo pigment core coated by a disazo pigment derived from the same coupling component or a different coupling component, or vice versa.

A further point which has been noted is that the core pigment may induce the coating pigment to adopt a particular crystal modification different from that normally formed by the coating pigment. In this case, the pigment forming the core may form only a minor proportion of the final composite pigment. The action, in this case, of the core forming pigment is that of a "seed" which controls the way the remaining coating pigment is precipitated from solution. The properties of the resulting pigment composition may therefore be controlled. For example, the stability in paint media of the pigment obtained by coupling diazo m-nitro-p-toluidine with acetoacetanilide may be greatly improved if about 10 percent of the final pigment weight, or even less, of the product of the coupling of diazo m-nitro-p-toluidine with acetoacet-o-toluidine is used as the seed or core pigment. The same improvement is not observed if the products are formed at the same time by a mixed coupling technique.

Pigment compositions according to the invention may be treated at any stage with any of the conventional solvents or surface active agents used to modify surface properties of pigments. Thus the core pigment may be formed in the presence of conventional additives, or treated with them after formation; the coating pigment may be formed in the presence of conventional additives. Conventional treatments will include surface active agent, solvent and resination treatments and treatments with amines and with dyestuffs as described in our copending applications, Ser. Nos. 21754/70; 34427/70; 34428/70 and 34429/70.

Some Examples will now be given, all parts and proportions being by weight unless otherwise stated.

EXAMPLE 1

A tetrazo solution was made from 19.0 parts of 3:3'-dichloro-benzidine in 450 parts of water.

16.5 parts of acetoacetorthoanisidide were dissolved in 225 parts of water containing 3.2 parts of sodium hydroxide. Dilute acetic acid was run into the solution until the pH was below 7.

The tetrazo solution was slowly added to the anisidide solution so that there was no substantial excess of tetrazo at any time, the pH being controlled at 4.0 – 4.5 by adding 10 percent sodium hydroxide solution, until all the coupling component had reacted.

16.5 parts of acetoacetmetaxylidide were dissolved in 225 parts of water containing 3.2 parts of sodium hydroxide, and this solution was added to the coupling reaction, keeping the pH below 7.0.

The remainder of the tetrazo solution was then run in slowly as before, avoiding any excess of tetrazo and maintaining pH greater than 4.0 by addition of 10 percent caustic soda solution.

The resulting slurry was boiled for 1 hour and the pigment composition was then isolated by filtering, washing the filter-cake free of water-soluble impurities and drying at 50°C.

The pigment composition was found to have mean crystallite size of $0.06\mu$ by X-ray powder diffraction and to have excellent flow and dispersibility properties in printing ink media, better than those of a simple physical mixture of the two pigments.

If pigment slurries of acetoacet-ortho-anisidide coupled to 3:1'-dichlorobenzidine and of acetoacet-meta-xylidide coupled to 3:3'-dichlorobenzidine are prepared in separate vessels and then mixed, and boiled and worked up, the mean crystallite size of the particles is below $0.03\mu$, amorphous to X-rays. The pigment composition prepared in this way by mixing slurries has poor rheological properties when introduced into letter press ink media.

EXAMPLE 2

The procedure described in Example 1 was repeated except that the ratio of the coupling agents was altered from equal parts by weight to 4:1 molar acetoacet-o-anisidide to acetoacet-m-xylidide. After formation, the slurry of pigment composition was boiled with 5 percent by weight of dibenzyl ether.

The final pigment composition was isolated by filtering the slurry, washing the filter-cake free of water-soluble impurities and drying at 50°C.

When the final pigment composition was incorporated in a letterpress ink medium, its rheological properties were found to be superior to those of a conventional pigment formed by coupling acetoacet-o-anisidide and 3:3'-dichlorobenzidine with the same solvent treatement. As in Example 1, the pigment composition has superior properties to those of a pigment formed by mixing prepared slurries.

EXAMPLE 3

The procedure described in Example 2 was repeated, except that the ratio of the coupling agents was altered to 1:4-molar acetoacet-o-anisidide to acetoacet-m-xylidide.

The pigment composition formed had better gloss and transparency when incorporated into letterpress ink medium than did the conventional pigment formed by coupling acetoacet-m-xylidide and 3:3'-dichlorobenzidine with the same solvent treatment.

A physical mixture of the two pigments, prepared in separate vessels, mixed and worked up did not give equal gloss and transparency when incorporated in letterpress ink media.

EXAMPLE 4

The procedure described in Example 2 was repeated except that acetoacetanilide was used instead of acetoacet-m-xylidide, and the ratio of the coupling agents was altered to 4:1 molar acetoacet-o-anisidide to acetoacetanilide.

The pigment composition formed had better rheological properties when incorporated into a letterpress ink medium than did the conventional pigment formed by coupling acetoacet-o-anisidide and 3:3'-dichlorobenzidine with the same solvent treatment. As in Example 1, the pigment composition has superior properties to those of a pigment formed by mixing prepared slurries.

EXAMPLE 5

The procedure described in Example 2 was repeated except that the acetoacet-m-xylidide was replaced by an equal molar proportion of acetoacet-o-toluidide.

The pigment composition formed had better rheological properties when incorporated into a letterpress ink medium than did the conventional pigment formed by coupling acetoacet-o-anisidide and 3:3'-dichlorobenzidine with the same solvent treatment. As in Example 1, the pigment composition has superior properties to those of a pigment formed by mixing prepared slurries.

EXAMPLE 6 a. The diazonium salt of m-nitro-p-toluidine was prepared from 44 parts of m-nitro-p-toluidine in the usual manner.

52.5 parts of acetonacetanilide were slurried in 1,200 parts of water at 5° – 6°C., and 13.5 parts of sodium acetate added. The pH was then adjusted to 4.8 – 5.0 with dilute acetic acid.

The diazo solution was run into the slurry with agitation over the course of 45 minutes, the pH being kept constant with addition of dilute sodium hydroxide and no substantial excess of the diazo component being present at any time. The slurry was then heated to 80°C. with live steam and filtered; the produce thus obtained was washed salt-free and dried at 50° – 55°C.

When this pigment composition was incorporated into a decorative paint medium, the color strength of the paint decreased when the paint was kept at 60°C.

b. The procedure in (a) above was repeated, except that 10 percent of the acetoacetanilide was replaced by acetoacet-o-toluidide, the two coupling agents being mixed together before the coupling. The pigment composition was incorporated into a decorative paint medium as in (a), and the color strength of the paint was found to decrease only slightly less than the paint prepared in (a) at 60°C.

c. 44 parts of the diazo salt of m-nitro-p-toluidine were prepared in conventional manner.

4 parts of acetocet-o-toluidide were dissolved in 0.9 parts of sodium hydroxide in 50 parts of water in a coupling vessel. A further 450 parts of water at 5° – 6°C. were then added, and the pH adjusted to 5.0 with dilute acetic acid. The theoretical amount of the solution of the diazo salt of m-nitro-p-toluidine to completely couple the toluidide was added over the course of 15 minutes.

48.25 parts of acetoacetanilide and 13.25 parts of sodium acetate were slurried in 1,200 parts of water at 5° – 6°C. and added to the coupling vessel. The remainder of the diazo solution was then added over the course of 45 minutes, and the pigment resulting was worked up as in (a) above.

The pigment composition was incorporated into a decorative paint medium as in (a), and the color strength of the paint was found to be stable on storage at 60°C.

EXAMPLE 7

The procedure described in Example 2 was repeated except that acetoacetanilide was used instead of acetoacet-m-xylidide and the ratio of the coupling agents was altered to 1:3 molar acetoacet-o-anisidide to acetoacetanilide.

The pigment composition formed had better gloss and transparency when incorporated into letterpress ink medium than did the conventional pigment formed by coupling acetoacetanilide and 3:3'-dichlorobenzidine with the same solvent treatment.

EXAMPLE 8

Coupling A

A tetrazo solution was made from 27.4 parts of 3:3'-dichlorobenzidine in 600 parts of water.

19.4 parts of acetoacetanilide were dissolved in a coupling vessel containing 300 parts of water and 4.4 parts of sodium hydroxide. Dilute acetic acid was run into this solution until the pH was below 7.0.

The tetrazo solution was slowly added to the acetoacetanilide suspension so that there was no substantial excess of tetrazo at any time, the pH being controlled at 4.0 – 4.5 by adding a 10 percent sodium hydroxide solution until the coupling component had reacted completely.

22.7 parts of acetoacet-o-anisidide were dissolved in 300 parts of water containing 4.4 parts of sodium hydroxide. This solution was run into the slurry in the coupling vessel simultaneously with the remainder of the tetrazo solution, the pH being controlled at 4.0 – 4.5 during the coupling by the addition of the necessary amount of a 10 percent sodium hydroxide solution. No substantial excess of tetrazo was allowed at any time during this second coupling.

The resultant pigment slurry was then boiled for 1 hour and the pigment was then isolated by filtering, washing the filter-cake free of water-soluble impurities and drying at 50°C.

Coupling B

A tetrazo solution was made from 27.4 parts of 3:3'-dichlorobenzidine in 600 parts of water. Separate pigment slurries were prepared from this as follows:

Slurry 1

19.4 parts of acetoacetanilide were dissolved in 300 parts of water containing 4.4 parts of sodium hydroxide. Dilute acetic acid was run into the solution until the pH was below 7.

300 parts of the tetrazo solution were slowly added to the acetoacet-anilide suspension so that there was no substantial excess of tetrazo at any time, the pH being controlled at 4.0 – 4.5 by adding 10 percent sodium hydroxide solution, until all the coupling component had reacted.

Slurry 2

22.7 parts of acetoacet-o-anisidide were dissolved in 300 parts of water containing 4.4 parts of sodium hydroxide. Into the coupling vessel was added 5.0 parts sodium acetate and 250 parts of water.

The remaining 300 parts of the tetrazo solution were slowly added with the anisidide suspension to the coupling vessel so that there was no substantial excess of tetrazo at any time, the pH being controlled at 4.0 – 4.5 by adding 10 percent sodium hydroxide solution, until all the coupling component had reacted.

Slurries 1 and 2 were mixed together and the resultant pigment slurry was then boiled for 1 hour and the pigment was then isolated by filtering, washing the filter-cake free of water-soluble impurities and drying at 50°C.

When incorporated into a letterpress ink varnish medium, the pigment composition resulting from Coupling A, the process according to the invention, is more transparent than the pigment resulting from Coupling B, a process yielding merely a physical mixture of pigments.

EXAMPLE 9

Coupling A

A tetrazo solution was prepared from 25.3 parts of 3:3′-dichlorobenzidine in 500 parts of water.

17.4 parts of 1-phenyl-3-methyl-5-pyrazolone were dissolved in 250 parts of water containing 4.0 parts of sodium hydroxide. Dilute acetic acid was run into the solution until the pH was below 7.

The tetrazo solution was slowly added to the pyrazolone slurry in a coupling vessel so that there was no substantial excess of tetrazo at any time, the pH being controlled at 4.0 – 4.5 by adding 10 percent sodium solution until all the coupling component had reacted.

20.7 parts of acetoacet-o-anisidide were dissolved in 250 parts of water containing 4.1 parts of sodium hydroxide, and this solution added to the coupling vessel simultaneously with dilute acetic acid keeping the pH below 7.0.

The remainder of the tetrazo solution was then run in slowly as before, avoiding any excess of tetrazo and maintaining pH greater than 4.0 by addition of 10 percent caustic soda solution.

The resultant pigment slurry was boiled for 1 hour and the pigment was then isolated by filtering, washing the filter-cake free of water-soluble impurities and drying at 50°C.

Coupling B

A tetrazo solution was prepared from 25.3 parts of 3:3-dichlorobenzidine in 500 parts of water. Separate pigment slurries were prepared from this as follows:

Slurry 1

17.4 parts of 1-phenyl-3-methyl-5-pyrazolone were dissolved in 250 parts of water containing 4.1 parts of sodium hydroxide. Dilute acetic acid was run into the solution until the pH was below 7.

250 parts of the tetrazo solution were slowly added to the pyrazolone suspension so that there was no substantial excess of tetrazo at any time, the pH being controlled at 4.0 – 4.5 by adding 10 percent sodium hydroxide solution, until all the coupling component had reacted.

Slurry 2

20.7 parts of acetoacet-o-anisidide were dissolved in 250 parts of water containing 4.0 parts of sodium hydroxide. Dilute acetic acid was run into the solution until the pH was below 7.

The remaining 250 parts of the tetrazo solution were slowly added to the anisidide suspension so that there was no substantial excess of tetrazo at any time, the pH being controlled at 4.0 – 4.5 by adding 10 percent sodium hydroxide solution, until all the coupling component had reacted.

Slurries 1 and 2 were mixed together and the resultant slurry was then boiled for 1 hour and the pigment was then isolated by filtering, washing the filter-cake free of water-soluble impurities and and drying at 50°C.

Coupling C

A tetrazo solution was prepared from 25.3 parts of 3:3′-dichlorobenzidine in 500 parts of water.

17.4 parts of 1-phenyl-3-methyl-5-pyrazolone and 20.7 parts of acetoacet-o-anisidide were dissolved in 500 parts of water containing 8.2 parts of sodium hydroxide. Dilute acetic acid was run into the solution until the pH was below 7.

The tetrazo solution was slowly added to the above mixed suspension so that there was no substantial excess of tetrazo at any time, the pH being controlled at 4.0 – 4.5 by adding 10 percent sodium hydroxide solution, until all the coupling component had reacted.

The resultant pigment slurry was boiled for 1 hour and the pigment was then isolated by filtering, washing the filter-cake free of water-soluble impurities and drying at 50°C.

Coupling D

As Coupling A, but the acetoacet-o-anisidide solution was coupled first followed by the 1-phenyl-3-methyl-5-pyrazolone solution on top.

When incorporated into a letterpress ink varnish medium, pigment composition from Coupling A gave superior transparency to the Coupling B product and much superior transparency to the Coupling D product. The pigment composition from Coupling C could not be compared coloristically with the rest as its hue was much too yellow.

EXAMPLE 10 i. A tetrazo solution was made from 21.2 parts of o-tolidine (3:3′-dimethylbenzidine) in 500 parts of water.

ii. A tetrazo solution was made from 25.3 parts of 3:3′-dichlorobenzidine in 500 parts of water.

iii. A solution was prepared of 37.6 parts of 1-p-tolyl-3-methyl-5-pyrazolone in 500 parts of water and 11.6 parts of sodium hydroxide.

iv. A solution was prepared of 41.4 parts of acetoacet-o-anisidide in 500 parts of water in 11.6 parts of sodium hydroxide.

Coupling A

Dilute acetic acid was run into solution (iii) until the pH fell below 7.0. Tetrazo solution (i) was added slowly so that there was no substantial excess of tetrazo at any time, the pH kept at 4.0 – 4.5 by adding 10 percent sodium hydroxide solution, until all of the coupling component had reacted.

Solution (iv) was run into the above coupled slurry and the pH kept below 7.0 by suitable addition of 10 percent sodium hydroxide solution. Finally, tetrazo solution (ii) was slowly added and the pH controlled between 4.0 and 4.5 as above until all the coupling component had reacted.

The slurry was boiled for 1 hour and the pigment was then isolated by filtering, washing the filter-cake free of water-soluble impurities and drying at 50°C.

This is an example of the process according to the invention.

Coupling B

Solutions (i) to (iv) were prepared as above.

Dilute acetic acid was run into solution (iii) until the pH fell below 7.0. Tetrazo solution (i) was added slowly, the pH being maintained at 4.0 – 4.5 as above.

Dilute acetic acid was run into solution (iv) until the pH fell below 7.0. Tetrazo solution (ii) was slowly added, the pH being maintained at 4.0 – 4.5 as above.

The two coupled slurries were then mixed, the combined slurry was boiled for 1 hour, and the pigment was then isolated by filtering, washing the filter-cake free of water-soluble impurities and drying at 50°C.

This pigment is classed as a physical mixture.

Coupling C

Solutions (i) to (iv) were prepared as above.

Dilute acetic acid was run into a mixture of solutions (iii) and (iv) until the pH was below 7.0. Tetrazo solutions (i) and (ii) were mixed and the combined solution was added slowly, the pH being maintained at 4.0 – 4.5 as above.

The slurry was then boiled for 1 hour and the pigment was then isolated by filtering, washing the filter-cake free of water-soluble impurities and drying at 50°C.

This process is an example of a mixed coupling.

When incorporated into a letterpress ink varnish medium, the pigment composition from Coupling A had tinctorial strength, transparency and gloss advantages over that from Coupling B, and was similar in hue.

The pigment composition produced from Coupling C when incorporated into the same letterpress ink varnish medium gave a much yellower hue and could not be compared coloristically with either of the products of Couplings A or B. This may be due to the presence of asymmetrical bisarylide compounds in the final pigment composition which will alter the hue of the pigment composition.

EXAMPLE 11 i. A tetrazo solution was made from 21.2 parts of 3:3'-dimethylbenzidine in 500 parts of water.

ii. A tetrazo solution was made from 25.3 parts of 3:3'-dichlorobenzidine in 500 parts of water.

iii. A solution was made of 75.4 parts of 1-p-tolyl-3-methyl-5-pyrazolone in 1,000 parts of water and 23.2 parts of sodium hydroxide.

Coupling A

Dilute acetic acid was run into solution (iii) until the pH fell below 7.0. Tetrazo solution (i) was added slowly so that there was no substantial excess of tetrazo at any time, the pH kept at 4.0 – 4.5 by adding 10 percent sodium hydroxide solution until all of the coupling component had reacted.

The slurry was boiled for 1 hour and the pigment was then isolated by filtering, washing the filter-cake free of water-soluble impurities and drying at 50°C.

This is an example of the process according to the invention.

Coupling B

Solution (iii) was split into two equal parts (a) and (b). Dilute acetic acid was run into (iii) (a) solution until the pH fell below 7.0. Tetrazo solution (i) was added slowly, the pH being maintained at 4.0 – 4.5 as above.

Dilute acetic acid was run into solution (iii) (b) until the pH fell below 7.0. Tetrazo solution (ii) was slowly added, the pH being maintained at 4.0 – 4.5 as above.

The two coupled slurries were then mixed, the combined slurry was boiled for 1 hour, and the pigment was then isolated by filtering, washing the filter-cake free of water-soluble impurities and drying at 50°C.

This pigment is classed as a physical mixture.

When incorporated into a letterpress ink varnish, ink prepared from the pigment composition from Coupling A had superior transparency properties over the ink from the composition prepared by Coupling B. The inks were of similar hue.

EXAMPLE 12 i. A tetrazo solution was prepared from 50.6 parts of 3:3'-dichlorobenzidine in 1,000 parts of water.

ii. A solution was prepared of 37.6 parts of 1-p-tolyl-3-methyl pyrazolone in 500 parts water and 11.6 parts sodium hydroxide.

iii. A solution was prepared of 35.8 parts of 1-phenyl-3-methyl-pyrazolone in 500 parts water and 11.6 parts sodium hydroxide.

Coupling A

Dilute acetic acid was added to solution (iii) until the pH was below 7.0. The tetrazo solution (i) was slowly added to this slurry as described in Example 9, maintaining the pH between 4.5 and 5.0 until all the coupling component had reacted.

Solution (ii) was slowly added simultaneously with 10 percent acetic acid solution to keep pH below 7.0. The remainder of solution (i) was slowly added at maintained pH of 4.5 – 5.0.

The final slurry was boiled for 1 hour; the pigment isolated by filtering, washing free of water-soluble impurities and drying at 50°C.

This is an example of the process according to the invention.

Coupling B

Solutions (i) to (iii) were prepared as above. Separate pigment slurries were prepared as follows:

Dilute acetic acid was added to solution (iii) until the pH was below 7.0. Half of tetrazo solution (i) was run in whilst maintaining the pH between 4.5 – 5.0 by suitable addition of 10 percent sodium hydroxide solution.

Dilute acetic acid was added to solution (ii) until the pH was below 7.0. The remainder of the tetrazo solution (i) was slowly added whilst maintaining the pH between 4.5 – 5.0.

The two slurries were mixed and the combined slurry boiled for 1 hour; the pigment was isolated by filtering, washing free of water-soluble impurities and drying at 50°C.

This pigment is classed as a physical mixture.

When incorporated into a letterpress varnish medium, the pigment composition of Coupling A gave an ink of enhanced tinctorial strength to that from Coupling B.

X-ray Powder Diffraction studies on both samples indicated that the pigment composition from Coupling A was of smaller crystallite size than that of Coupling B.

EXAMPLE 13 i. A diazo solution was made from 58 parts of meta-nitro-para-toluidine in 1,500 parts of water and 55 parts of sodium acetate were added.

ii. A diazo solution was made from 58.0 parts of para-nitro-ortho-toluidine in 1,500 parts of water.

iii. A solution was prepared from 57.8 parts of β-Naphthol dissolved in 1,000 parts of water at 60°C with 25 parts of sodium hydroxide. 1,500 parts of water were added and the solution was kept at 40°C.

iv. A dispersion was prepared from 110.0 parts of Naphthol AS-D

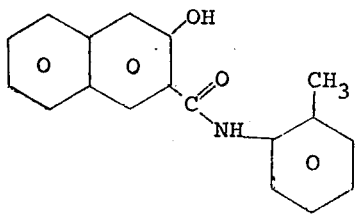

in 1,000 parts of water at 95°C containing 11.7 parts of Turkey Red oil and 31 parts of sodium hydroxide. The final volume was made to 1,500 parts at 40°C by addition of water.

Coupling A

To solution (iii) was added 700 parts of diazo (i) allowing no substantial excess of diazo to be present at any time. The remainder of solution (iii) was added and the remainder of the diazo solution was then run in, again allowing no substantial excess of diazo to be present at any time. The slurry was then heated to 40°C. and solution (iv) was added. Diazo solution (ii) was then added over 1 hour to the combined slurry kept at 40°C., no substantial excess of diazo being allowed at any time. The pigment was isolated by filtration, washing to remove water-soluble impurities and drying at 50°C.

Coupling B

The two pigments were prepared in separate vessels using the same quantities and conditions as above. After coupling, the two slurries were mixed and held at 40°C. for 1 hour. The physical mixture of slurries was then filtered, the press-cake washed free of water-soluble impurities and the pigment dried at 50°C.

On incorporation into a letterpress ink varnish medium, the pigment composition prepared by Coupling A was tinctorially stronger and more transparent than that prepared by Coupling B.

EXAMPLE 14

Example 12 was repeated but the Naphthol AS-D was replaced by Naphthol AS-E

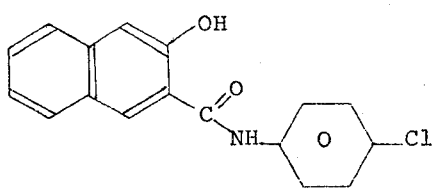

(113.6 parts) and the paranitro-ortho-toluidine by meta-nitro-ortho-toluidine (58 parts). The pigment composition prepared according to the invention had better tinctorial strength and transparency properties than did a simple physical mixture of the pigments when incorporated into letterpress ink varnish media.

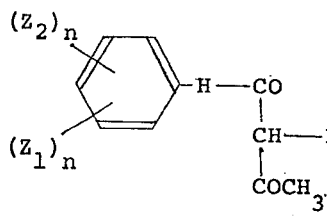

What we claim is:

1. A pigment composition comprising a first pigment selected from the group consisting of arylamide, diarylamide and naphthol azo pigments having precipitated on the surface thereof a second pigment which differs from the first pigment and is also selected from the group consisting of arylamide, diarylamide and naphthol azo pigments, said second pigment being present in an amount ranging from 95:5 to 5:95 parts by weight of said first pigment.

2. A pigment composition according to claim 1 wherein the first and/or second pigment is an arylamide pigment having the formula

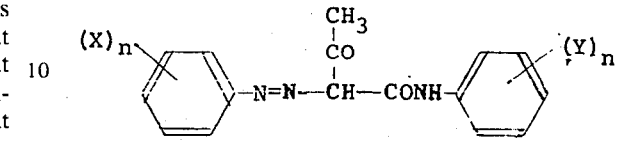

wherein X is hydrogen, methyl, methoxy, halogen or nitro or combinations of these groups when $n>1$, and Y is hydrogen, methyl, methoxy or halogen or combinations of these when when $n>1$
or

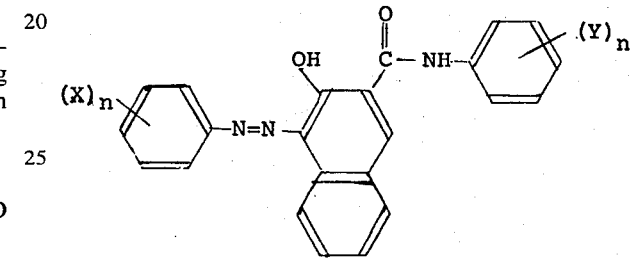

wherein X, Y and $n$ have the above significance.

3. A pigment composition according to claim 1, wherein the first and/or second pigment is a diarylide pigment having the formula

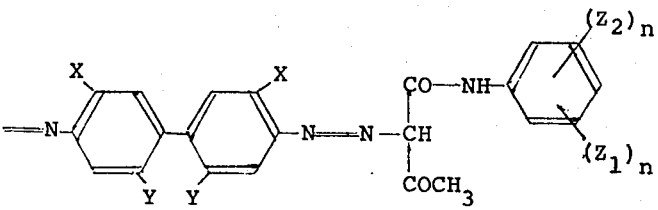

wherein X and Y are the same or different and each is H, $CH_3$, $OCH_3$ or Cl, and $Z_1$ and $Z_2$ are the same or different and each is H, $CH_3$, $OCH_3$ or Cl and $n$ is 1 or 2.

4. A pigment composition according to claim 1, wherein the first and/or second pigment is a diarylide pigment having the formula

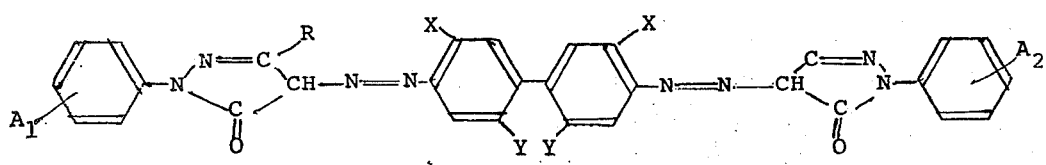

wherein X and Y are the same or different and each is H, $CH_3$, $OCH_3$ or Cl and $A_1$ and $A_2$ are the same or different and each is H, or alkyl, halogen and R is alkyl, carbalkoxy or carboxamide residues.

5. A pigment composition according to claim 1, wherein the first and/or second pigment is a diarylide pigment having the formula

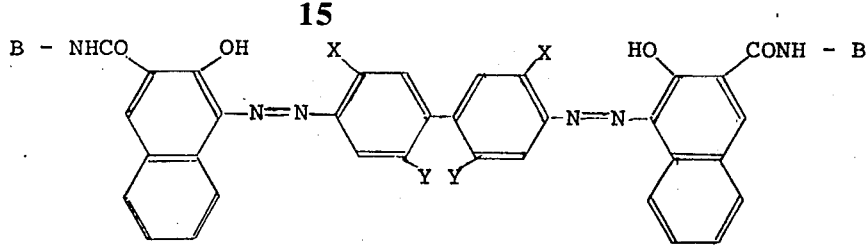

wherein X and Y are the same or different and each is H, $CH_3$, $OCH_3$ or Cl and B is the group

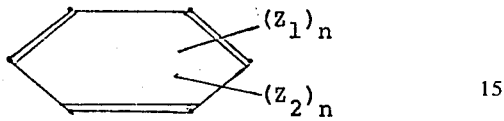

wherein $Z_1$ and $Z_2$ are the same or different and each is H, $CH_3$, $OCH_3$ and Cl, and $n$ is 1 or 2, or B is an α-naphthyl residue.

6. A process for the preparation of a pigment composition according to claim 1 which comprises a. preparing a slurry of a first azo pigment in an aqueous medium;

b. preparing in the slurry from step (a) a second different azo pigment from a common or different diazo or tetrazo and a common or different coupling component so that said second azo pigment is precipitated in the presence of said first azo pigment; and c. isolating the pigment composition of step (b).

7. A process for the preparation of a pigment composition according to claim 6 wherein the product of step (b) is heated prior to isolation of step (c).

* * * * *